(12) United States Patent
Dieffenderfer et al.

(10) Patent No.: US 7,730,282 B2
(45) Date of Patent: Jun. 1, 2010

(54) METHOD AND APPARATUS FOR AVOIDING DATA DEPENDENCY HAZARDS IN A MICROPROCESSOR PIPELINE ARCHITECTURE USING A MULTI-BIT AGE VECTOR

(75) Inventors: James N. Dieffenderfer, Apex, NC (US); Nathan S. Nunamaker, Durham, NC (US); Sanjay B. Patel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 10/916,188

(22) Filed: Aug. 11, 2004

(65) Prior Publication Data
US 2006/0037023 A1    Feb. 16, 2006

(51) Int. Cl.
*G06F 9/00* (2006.01)
(52) U.S. Cl. ............................ 712/216; 712/217
(58) Field of Classification Search ................. 712/220, 712/216
See application file for complete search history.

(56) References Cited

U.S. PATENT DOCUMENTS

| | | | |
|---|---|---|---|
| 4,757,444 A | 7/1988 | Aoyama et al. | |
| 4,799,183 A | 1/1989 | Nakano et al. | |
| 5,471,591 A | 11/1995 | Edmondson et al. | |
| 5,805,849 A * | 9/1998 | Jordan et al. | 712/214 |
| 5,898,853 A * | 4/1999 | Panwar et al. | 712/216 |
| 5,903,918 A * | 5/1999 | Bauman et al. | 711/220 |
| 6,138,230 A | 10/2000 | Hervin et al. | |
| 6,212,623 B1 * | 4/2001 | Witt | 712/216 |
| 6,260,189 B1 | 7/2001 | Batten et al. | |
| 6,334,182 B2 * | 12/2001 | Merchant et al. | 712/214 |
| 6,360,292 B1 | 3/2002 | Manning | |
| 6,408,378 B1 | 6/2002 | O'Connor | |
| 6,438,681 B1 | 8/2002 | Arnold et al. | |
| 6,470,445 B1 | 10/2002 | Arnold et al. | |
| 6,490,674 B1 | 12/2002 | Arnold et al. | |
| 6,542,986 B1 | 4/2003 | White | |
| 6,542,988 B1 * | 4/2003 | Tremblay et al. | 712/225 |
| 6,662,293 B1 * | 12/2003 | Larson et al. | 712/216 |

(Continued)

FOREIGN PATENT DOCUMENTS

JP     2001092660 A     9/1999

OTHER PUBLICATIONS

"UltraSparc-3 Aims at MP Servers" Peter Song—Oct. 27, 1997, Microprocessor Report.*

(Continued)

*Primary Examiner*—Eddie P Chan
*Assistant Examiner*—Keith Vicary
(74) *Attorney, Agent, or Firm*—Thomas E. Tyson; Joscelyn G. Cockburn; Mark E. McBurney (57) ABSTRACT

A method and system for avoiding various hazards for instructions which are propagating through a microprocessor pipeline. When a plurality of instructions exist within the pipeline which read and write the same value, a vector is established to distinguish the older from the newer instructions. Further, before instructions are dispatched for execution, pointers are generated which identify the particular instruction which had the operand or parameter value needed. Accordingly, by monitoring both the recent vector and pointers, dated dependency hazards can be avoided.

13 Claims, 5 Drawing Sheets

U.S. PATENT DOCUMENTS

2002/0169947 A1    11/2002    Bilardi et al.

OTHER PUBLICATIONS

"Synchronous Counters—Final Report" Retrieved from archive.org dated Jun. 13, 2002. Note that archive.org had trouble rendering the cached page. Therefore, a current page has been included for reference, and a screenshot of the cited portion from the cached copy is included in particular to show that this information was available at that date.*

Diefendorff et al. (Diefendorff) (PC Processor Microarchitecture) Microdesign Resources, Jul. 12, 1999, Microprocessor Report.*

RD-414103-A, Oct. 10, 1998.

* cited by examiner

| RV | INSTRUCTION # | POINTER |
|---|---|---|
| 0100 | Instruction 1 | R3 ⟶ R3<br>R2 ⟶ R2 |
| 1000 | Instruction 2 | R6 ⟶ Instruction 1<br>R5 ⟶ R5 |
| 1000 | Instruction 3 | R7 ⟶ Instruction 2<br>R8 ⟶ R8 |
| 1000 | Instruction 4 | R6 ⟶ Instruction 3<br>R3 ⟶ R3 |

METHOD AND APPARATUS FOR AVOIDING DATA DEPENDENCY HAZARDS IN A MICROPROCESSOR PIPELINE ARCHITECTURE USING A MULTI-BIT AGE VECTOR

The present invention relates to the processing of instructions of a computer program using parallel processing. Specifically, a method and apparatus for detecting the hazards due to data dependencies, and for avoiding the detected hazards are provided.

Computer instructions are parallel processed through a plurality of pipelines formed in the computer processor which reduces the total time required to process a set of instructions. These pipeline systems are typically organized so that three execution paths are provided, two of which deal with arithmetic/load unload instructions, and the third which deals a branch instruction execution. Instructions are fetched from an instruction cache and dispatched to the various pipelines for parallel execution. Each stage of a pipeline may execute a portion of an instruction in a given clock cycle. The results of the execution are then forwarded to a subsequent stage of the pipeline where they may be further processed.

Certain instructions, including arithmetic instructions, require various operands before they can be executed. These operands may be stored in an operand register, where they are available once the instruction is dispatched for execution. The register may also be rewritten with a new value once execution of a related instruction occurs which updates the operand value.

The parallel execution pipelines provided by the microprocessor may end up processing instructions which are out of order. In this scenario, values for operands may be the subject of a computation by an earlier instruction, which is meant to replace a default value in the operand register. Once a subsequent instruction enters one of the pipelines, it may attempt to read the operand register prior to the time the new value is available and stored in the appropriate operand register. This type of hazard is generally referred to as a Read after Write (RAW) hazard when an instruction wants to read the value of the operand register or resource while an older instruction is updating the resource, but has yet to write the new value to the resource.

Another dependency which causes a different type of hazard, a write after write (WAW) hazard, results when more than one instruction wants to write a particular resource, such as an operand register. If the instructions are not executed in order, the final value of the resource may not be the result of the latest instruction, but may be the result of a previous instruction which determines the value for writing to the resource. In these scenarios, the older instruction in the pipeline should always write the value before the newer instruction or the older instruction drops the value after the resource was updated by the newer instruction.

An additional type of hazard which results from a data dependency is the write after read (WAR) hazard. The WAR occurs when an instruction writes the value of a resource before an older instruction that needs the previous value from the resource has read that resource. The older instruction needs a value that has been stored in a resource; such as an operand register, before the newer instruction updates it. If this protocol is not observed, the newer value will be read and an erroneous calculation may be made by the older instruction.

These hazards are further compounded as the size of pipelines grow to achieve execution efficiency. The more pipelines and pipeline stages there are, the more updates to a particular resource or reads of a particular resource occur, increasing the risk of these hazards.

SUMMARY OF THE INVENTION

A method and apparatus are disclosed which selects the correct instruction of multiple instructions which calculate a value to update a resource and to resolve a RAW hazard. A recent vector is associated with each instruction which determines its age with respect to other instructions writing the same resource. The recent vector identifies the location in the pipeline of the newest update to a resource, so that the newest value being computed in a pipeline may be made available for updating the resource and the older ones discarded.

The recent vector logically travels with the instructions as they are dispatched to the pipeline. The bits of the recent vector are selectively shifted when a new instruction enters the pipeline calculating a value for the same resource. By examining the recent vector of the various instructions calculating a value for the same resource, the identity of the most recent instruction, even if out of order in the execution sequence, may be readily ascertained, and write after read (WAR) and write after write (WAW) hazards can be avoided.

Additionally, the invention provides for a set of pointers in the instruction dispatch unit for identifying which instruction calculates a value which is needed by a subsequent instruction. Thus, when that value becomes available in the execution pipeline, it is possible to directly transfer the value to a register associated with the most recent instruction needing the value. In this way, the resource need not be written directly in order for the instruction to obtain the value. Instead, as values are calculated, they can be identified to the instruction dispatch unit for use by subsequent instructions needing the value.

DESCRIPTION OF THE PREFERRED EMBODIMENT

Figure 1:
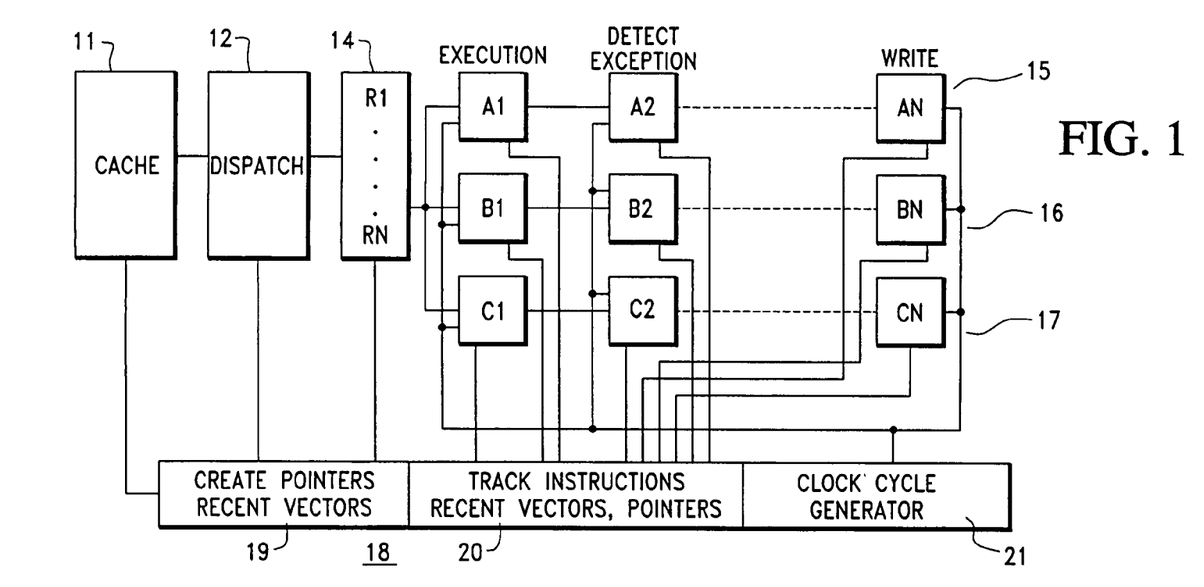
FIG. 1 shows a microprocessor system which has a pipeline architecture under control of the present invention.

Referring now to FIG. 1, a block diagram of a pipeline microprocessor is shown incorporating an embodiment of the present invention. The pipeline processor architecture includes a series of pipeline stages 15, 16 and 17 which execute instructions in parallel. Usually pipeline stages are devoted to execution of a particular type of instruction type, such as an arithmetic, load store, or branch instruction. In the embodiment contemplated for the present invention, two pipelines 15, 16 have stages A1 through AN and B1 through BN which execute arithmetic and load/store type instructions.

Pipeline 17 is a conventional branch instruction execution pipeline having stages C1 through CN.

Instructions for execution by the individual pipelines 15, 16 and 17 are derived from an instruction cache 11. Under a control of a control section 18, instructions are forwarded from the instruction cache to an instruction dispatch unit 12. The instructions may be arithmetic instructions, load/store instructions, or even branch instructions, and the instruction dispatch unit 12 will prepare the instructions for dispatch to one of the pipelines 15, 16 or 17 for execution.

Pipelines stages of each pipeline 15, 16, and 17 can, in their least complex form, include an execution stage, a detect exception stage, and a write stage as shown in FIG. 1. During the execution stage, arithmetic instructions are executed and the result obtained is written to a register in the control unit 18 denoted generally as track instructions/recent vectors 20. As instructions move through the pipeline, their location in a particular stage is identified, along with the identity of a target register where the value obtained as a result of execution of an instruction is to be stored.

Instructions which are received by the instruction dispatch unit 12 often require an operand before they can be passed into the pipeline for execution. In the case of an arithmetic instruction, these operands may be recovered from a register file 14 which initially includes default values of the operand for the instruction. As the execution flow progresses, however, these values are updated by instructions in the pipelines and are replaced by a current value determined from the execution of a previous instruction. Problems arise when there are more than one instruction in the pipeline calculating the same value. Generally, it is the more recently dispatched instruction which calculates the most recent value, and it is important that older calculated values are not utilized by instructions which are being dispatched.

Thus, the instruction dispatch unit 12 must be certain that it recovers the correct value (which is usually the most recent value) for an operand before dispatching the instruction to the pipelines for execution.

As set forth previously, other problems can arise when a stream of instructions is using a value obtained from a previous instruction. Specifically, a read after write command (RAW) of a particular value, which is first written to a resource, such as a cache memory, and then read, may be the operand of several instructions. In order to be certain the most current value is being used, the invention will identify the most recent instruction which calculates a value for the operand before it reaches the write stage of a pipeline and is written to the resource. In this way, the value is available to a waiting instruction in the dispatch unit 12 before it is written to the resource.

The control for the various pipelines includes a clock cycle generator 21 in control unit 18 which controls the movement of instructions from one stage of a pipeline to another. Additionally, each instruction is tracked by the track instruction control section 20 according to the stage of execution that is currently being processed. This section of the control for the pipeline processors will identify those instructions which determine the value of the same operand, so that the newest and oldest instructions can be differentiated. By tracking the instructions in this way, it is possible to be certain that the most recently calculated a value of an operand is used where needed.

Section 19 of the control unit 18 generates the recent vector associated with each newly dispatched instruction calculating a value for the same operand propagating through the pipeline, as well as pointers for identifying to an instruction being dispatched by the dispatch unit 12, where a value for an operand for the instruction will be located. Initially, instructions may receive a default value of an operand stored in the register file 14, and commence execution from these default values. However, as execution of the instructions occur in the pipeline, these values will be updated, and other resources will be written with other data from other instructions being executed.

In accordance with the preferred embodiment of the invention, pointers are created in control section 19 so the instruction dispatch unit 12 can identify where operand values are to be found for instructions to be dispatched by the dispatch unit 12. The pointers identify an instruction in the pipeline which calculates a value needed for the instruction, as well as a target register which contains the value. Once the values are available for the recently received instructions in the instruction dispatch 12, the pointers are discarded and the instruction is forwarded to the execution pipeline.

Recent vectors are created to identify instructions in the pipeline 15, 16, stages which calculate a value for the same operand. As the instruction propagates through the pipeline, the recent vector is shifted each time a new instruction is received from the instruction dispatch unit 12 calculating the same value. In this way, the newest instruction for calculating the value of the same operand is always identified so that the various dependencies which can produce write after write (WAW), write after read (WAR), and read after write (RAW) hazards can be avoided as will be clear in the forthcoming discussion.

Figure 2:
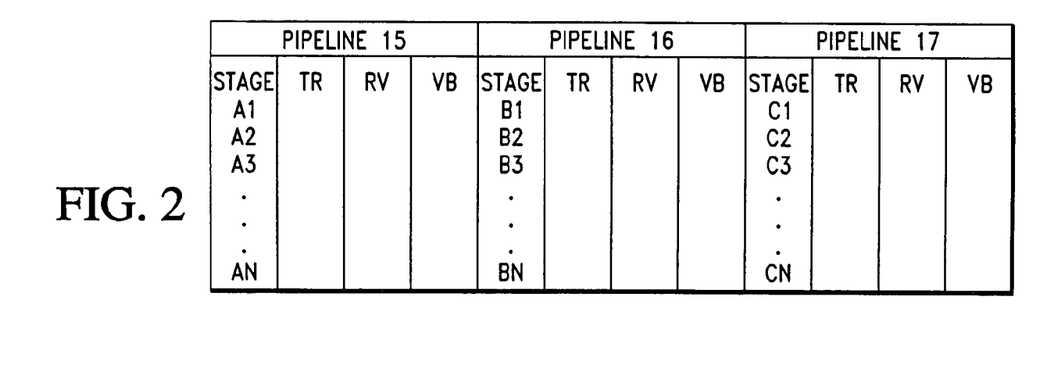
FIG. 2 illustrates the table of the control section of FIG. 1 for monitoring the recent vector of an instruction and which defines a target register where data will be written.

The track instructions/recent vectors section 20 tracks the status of each stage in the pipeline which is executing an instruction. As shown in FIG. 2, the pipeline stages are associated with a target register (TR), recent vector register (RV), and a valid bit register (VB). As each instruction moves through a given pipeline, these registers are loaded with relevant data while the instructions are being executed.

Figure 3:
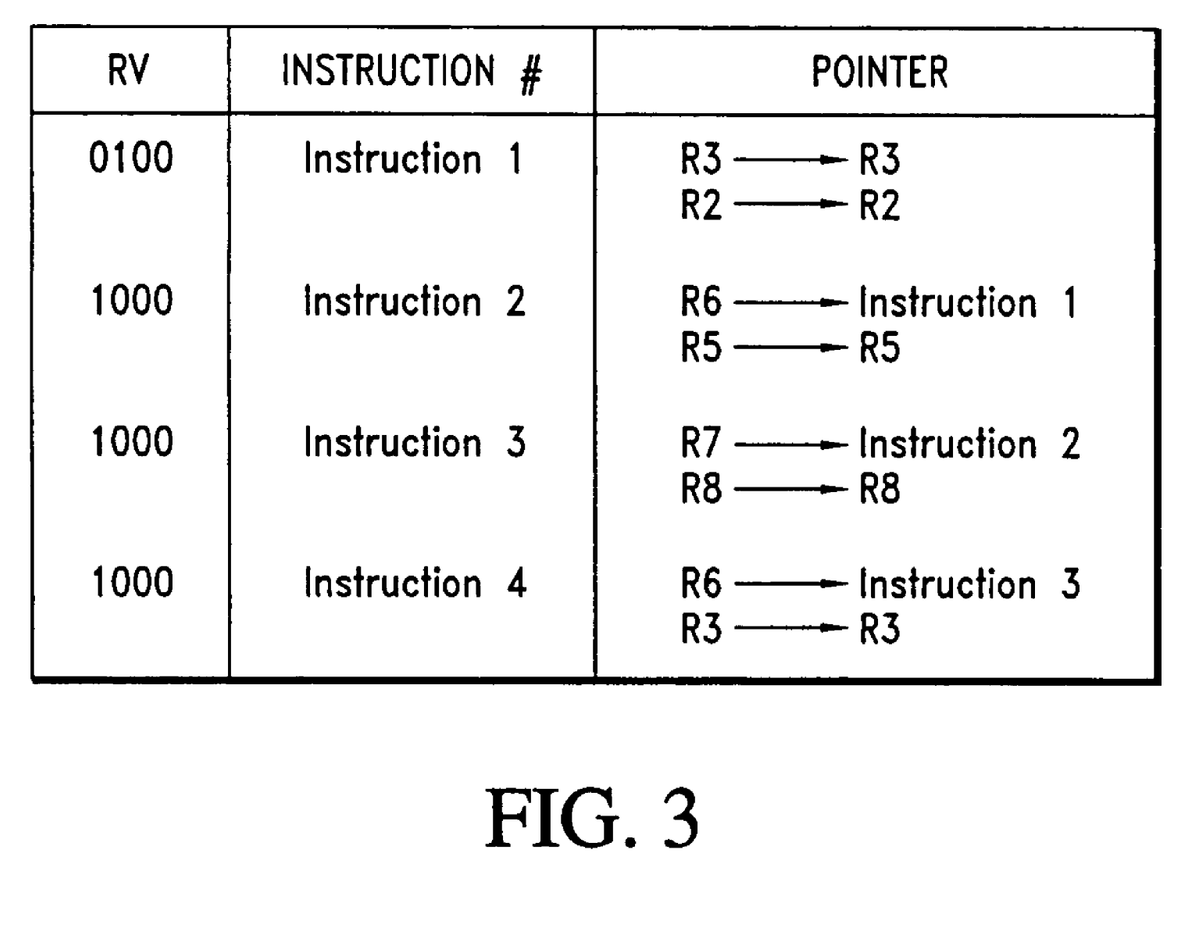
FIG. 3. illustrates a portion of the control section which generates pointers for each of the instructions of the dispatch unit to locate a value needed for an instruction waiting to be dispatched.

The pointers are created in the control section 19 as shown in FIG. 3. FIG. 3 will be explained with respect to an instruction sequence of four instructions representing arithmetic Add instructions. These instructions are, from oldest to newest, as follows:

| INSTRUCTION # | OPERATION |
| --- | --- |
| 1 | Add R6, R2, R3 |
| 2 | Add R7, R5, R6 |
| 3 | Add R6, R7, R8 |
| 4 | Add R5, R6, R3 |

These common arithmetic instructions represent the arithmetic statement R6=R2+R3, R7=+R5+R6, R6=R7+R8 and R5=R6+R3. As can be seen, instruction number 4 requires a value which is computed in instruction number 3 as well in instruction number 1. Finally, instruction number 3 requires the value for R7 which is computed in instruction number 2. The pointers are created to point to the newest value being calculated for the operand of newly dispatched instructors.

The pointer/recent vector section 19 creates for instruction number 1 a pointer, which points to location R3 and R2 of the register file 14. Since, in the foregoing example, there are no previous instructions for determining the value of R3 or R2, they are default values located in locations R2 and R3 in the register file 14 as either default values, or previously calculated values which have been written to the register file 14.

In the case of an arithmetic instruction, once it is executed, a result is obtained and written to the target register. Further, the recent vector which travels with the instruction, moves to the next stage and is shifted if a new instruction entering the pipeline calculates a value for the same operand. Instruction number 2 has values R6 and R5 as operands. The operand R6 is located from instruction number 1, which determines the most recent value for R6. R5 is also located in the register file as no previous instructions are shown for calculating these operands. Instruction number 3 requires the values of R7 and R8. The pointer for R7 points to instruction number 2 which calculates the most recent value for R7. Additionally, R8 is pointed to as being available in locating the register file 14. Instruction number 4, the most recent of the instructions, requires a calculation for R6 and R3 as operands. Accordingly, the pointers associated with the instruction number 4, while the instructions remain in instruction dispatch unit 12, will point to instruction number 3 as the location of R6, and a pointer for value R3 will point to location 3 in the register file 14 containing this value.

The instruction pointers are maintained for as long as it takes to acquire all of the operands for the instructions which are pending for dispatch. Once the instructions have received the operand, the pointer is dropped and the instruction 15 dispatched to the appropriate pipeline for processing.

The dispatch of instructions from dispatch unit 12 creates a recent vector for each instruction which is dispatched. As shown in FIG. 3, both instruction 1 and instruction 3 calculate a value for R6. As instruction 1 is older, the track instructions/recent vectors unit 20 will shift the value to 0100 so that the system can clearly identify the most recent instruction for calculating the value of R6 is instruction 3.

The process of creating pointers to identify the location of a value of the operand to be used in an instruction being dispatched avoids wasted clock cycles. While each of the instructions may call for a value being calculated to be stored in a given resource, the value is available in the target register of the stages A1-An and B1-Bn before being written to the resource. Accordingly, the instruction uses the value in the target register for an operand before it is written to a particular resource.

Figure 4:
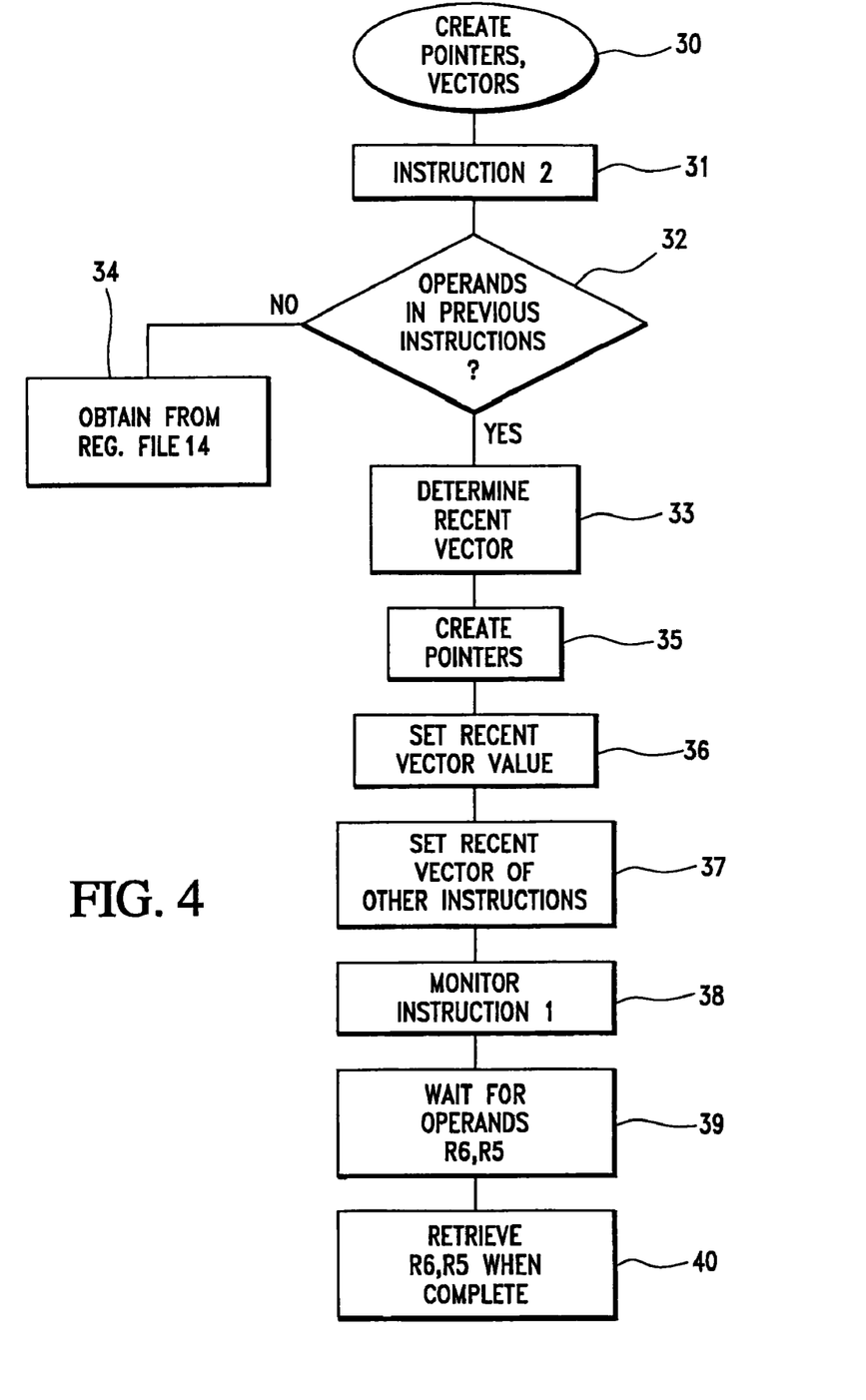
FIG. 4 is a flowchart showing the creation of pointers and vectors by the control section for the dispatch unit.

The process of creating pointers and vectors for carrying out the foregoing functions of the control for section 19 and 20 is shown in FIG. 4. FIG. 4 will be described with respect to the dispatching of instruction number 2 in step 31 which arrives at the instruction dispatch unit 12 at step 30. As seen from above, instruction number 2 requires the operands R6 and R5. The pointers and recent vector section 19 will determine whether or not the operands exist in a previous instruction in the decision block 32. If not, then the operands are obtained as default values from register file 14 in step 34. If there are previously dispatched instructions which calculate R5 and R6, steps 33, 35 create pointers for the values of operands R5 and R6.

Since R5 is not determined from a previously dispatched instruction in the pipeline, its value would be obtained from location R5 of the register file 14. Operand R6 is, however, the subject of calculation in instruction number 1. Accordingly, a determination is made in step 33 to identify the most recent instruction which determines the value of operand R6. An examination of the recent instruction vector 5 identifies instruction 1 as having the appropriate value for R6, since the recent vector for instruction has the maximum value 1000.

Following a determination that it is instruction number 1 which contains the operand value R6, the recent vector value for instruction number 2 is set at 1000 in step 36.

Instruction number 1 is monitored, in step 38. When it has completed calculating the value R6 in step 39, the value is forwarded in step 40 to the instruction dispatch unit 12 along with the value of operand R5 from register file 14. Instruction 2 is then ready for dispatch in step 40.

Instructions number 3 and 4 are processed similarly. When instruction number 3 is ready for dispatch; decision block 32 determines whether or not any previous instruction calculates the operands for instruction number 3. As shown in FIG. 3, pointers have been created showing that the instruction number 3 requires the calculation R7 obtained from instruction number 2 as well as the value R8, which is identified by a respective pointer as being in the register file location R8.

Since R8 can be directly determined, step 34 obtains R8 from the register file 14. Step 33 determines if a recent vector exists for determining the values of R7. Since R7 is the result of the calculation for instruction number 2, the pointer points to instruction number 2 and when the instruction is executed, the value for operand R7 is recovered from the target register.

Since instruction number 3 requires the value of R7 and R8, pointers are created pointing to instruction number 1 as well as location 8. A recent vector value of the maximum, 1000 is set for the instruction and it is then dispatched to main pipelines for execution.

At the same time, there are two instructions in the pipeline, each of which calculate R6, instruction number 1 and instruction number 3. In step 37, the recent vector of the older instruction number 1 is decremented to 0100 since it is the older of the two instructions which calculate the same value for the operand R6. Thus, any subsequent instructions to be processed which require the value of R6 will be able to determine in step 83 the most recent for the operand R6 and pointers to that value will be created for the next instruction requiring a value of R6.

Accordingly, when instruction number 4 is processed, two instructions within the pipeline, instructions 1 and 3, will have different recent vectors, so that instruction number 4 may be dispatched with a pointer pointing to instruction number 3 for the value of R6.

Figure 5:
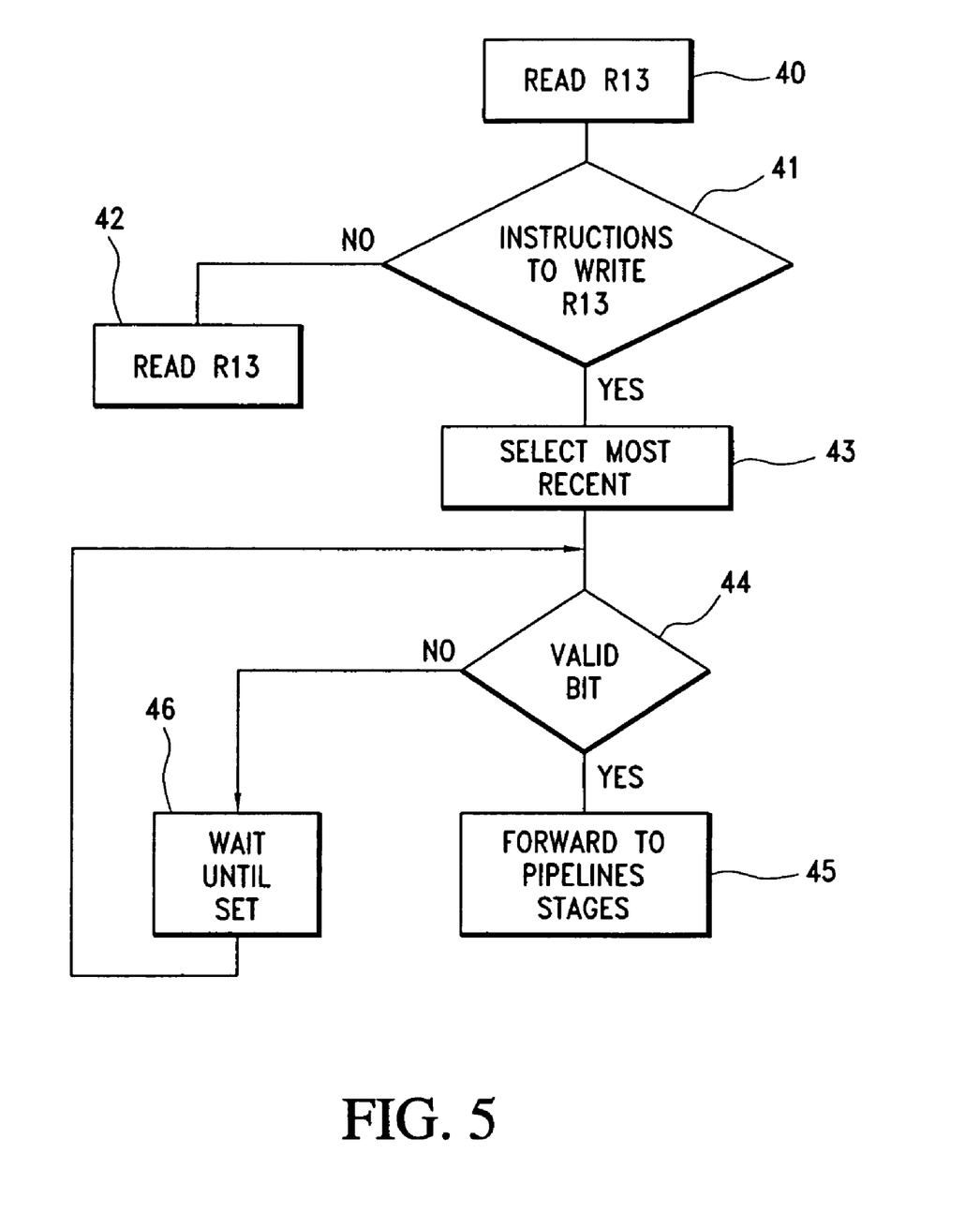
FIG. 5 is a flow chart showing how the system avoids the read after write (RAW) hazard.

The use of the various pointers can avoid the data dependency hazards of a read after write (RAW), a write after write (WAW), and a write after read (WAR) hazard. Referring now to FIG. 5, the instruction execution sequence is described for reading a value of operand R13, and avoiding the hazard of reading of an older value of R13 from an older instruction which may also determine the value for operand R13. The process begins in step 40, wherein an instruction in the dispatch unit requires a value for the operand R13. A determination is made in step 41 whether any instructions in the pipeline is going to write the value of R13 to a resource, such as the register file 14. If there are no instructions waiting to write a value R13 for a resource, then R13 is read in step 42 from the register file 14.

In the event there are multiple instructions in the execution pipeline for writing the value of operand R13, the most recent one is identified by checking the recent vector of each of those instructions in step 43. When the value is available, as a result of the execution of the instruction in the pipeline stage, the valid bit is set as shown in FIG. 2 and the target register is written with the value. In the event that the target register does not contain the valid data, indicating the instruction is still to be executed, instruction dispatch unit 12 waits in step 46 for the value to become available. As soon as the valid bit is set within the target register for the operand, the system forwards the value to the instruction unit 12 in step 45 which then dispatches the new instruction to the pipelines for execution. The value calculated for R13 may then be written to the resource in a later pipeline stage.

Thus, the read after write hazard (RAW) is avoided through a combination of the use of the pointers and recent vectors for distinguishing older write instructions from the newest values which are the ones of interest.

Figure 6:
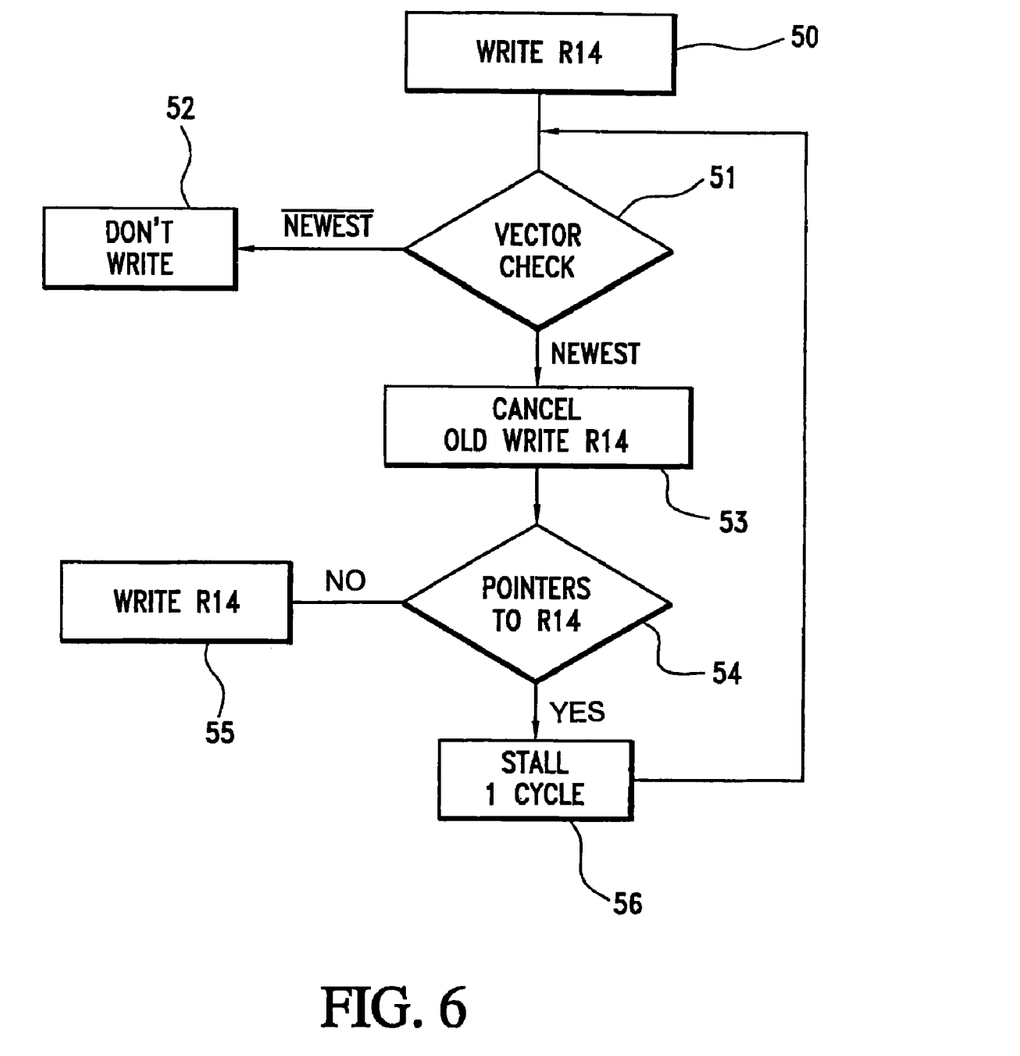
FIG. 6 is a flowchart showing how the system avoids a write after write (WAW) and write after read (WAR) hazard.

FIG. 6 shows how the systems avoids the consequence of a write after write (WAW) hazard or a write after read (WAR) hazard. The process begins when an instruction is received in the instruction dispatch unit 12 to write a value such as R14 to a particular resource in step 50. At this time, the recent vectors of all instructions in the pipelines which write the value of R14 are checked in decision block 51. If an instruction is found which does not have a recent vector of 1000, meaning there is at least one newer instruction to write the value of R14 in the pipelines, the instruction is inhibited from writing to R14 in step 52. If there is more than one instruction in the execution pipeline to write the value of R14 to the resource, the older ones are cancelled in step 53. If there are no pointers to R14 indicating that dispatch unit 12 does not have an instruction which requires the value of R14, the newest instruction which writes R14 is permitted to write the value in step 55. When a pointer exists within the control function 19 to a value of R14 which is needed for a recent instruction which is awaiting to be dispatched, the instruction to write R14 is stalled in step 56 until such time as there are no pointers pointing to the value of R14 within the instruction dispatch unit 12.

The foregoing process shows that as long there is an instruction in the dispatch unit 12 waiting for the value of R14, R14 is not written to the resource until it has been obtained for the pending instruction. Thus, older instructions are not permitted to write to the resource, and the newest of instructions is given time to complete before writing its value to the resource.

The foregoing process avoids both the write after write (WAW) hazard, as well the write after read (WAR) hazard. In making certain that are no pointers pointing to an instruction which requires a value for R14, it is possible to avoid writing a value for R14 until any pending instruction has received its value before being dispatched.

Whereas, the foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What we claim is:

1. A method for processing in a pipeline processor a series of instructions for writing to a common resource which series of instructions raise a sequencing issue, comprising:

associating a vector with each instruction entering the pipeline which writes to said common resource of the processor;

subsequent to said associating a vector, changing a value of each other vector associated with said series of instructions for writing to a common resource, said changing including changing more than one of said other vectors which are available in said pipeline each time a new instruction to write to said common resource is received in said pipeline processor so that a relative age of each said instruction is determined in said pipeline processor; and writing said common resource in a sequence reflecting the relative age of said instruction.

2. The method according to claim 1, wherein said common resource is written only with data determined from a latest instruction entering said pipeline processor.

3. The method according to claim 1, wherein said common resource is written with data from said instructions in a sequence where earlier instructions are written before later instructions.

4. The method according to claim 1, wherein said step of associating includes combining with said instruction a multi-bit vector representing an age of said instruction in the pipeline processor.

5. The method according to claim 4, wherein a multi-bit vector of a said read instruction is decreased in value each time a new instruction that writes to said common resource is received in the pipeline.

6. A method for processing a series of read and write instructions, each directed to a common resource of a pipeline processor, to take account of sequencing issues, said method comprising:

associating a vector having a value with each write instruction entering the pipeline;

subsequent to said associating a vector, changing a value of each other vector in said pipeline associated with an instruction writing to said common resource each time a new write instruction which writes to said common resource enters the pipeline, said changing including changing more than one of said vectors which are available in said pipeline each time a new instruction writing to associated with said common resource is received in said pipeline processor so that a relative age of an instruction may be determined; and stalling a write instruction from writing data to said common resource until said common resource has been read by each read instruction which is earlier than said write instruction.

7. A method according to claim 6, wherein said vector comprises a multi-digit vector number which is appended to each of said instructions when said instruction enters the pipeline processor.

8. The method according to claim 7, wherein the value of said vector for an instruction in said pipeline is decremented each time a new write instruction writing to said common resource enters said pipeline.

9. A method for processing a series of read and write instructions to a common resource in a pipeline processor comprising:

associating a vector with each instruction entering said pipeline processor which calculates a particular operand value;

subsequent to said associating, shifting each other vector associated with instructions which calculate said particular operand value each time a new instruction enters the pipeline which calculates the particular operand value wherein a newest instruction vector in the pipeline processor has a highest value, said shifting each other vector including shifting more than one said other vector in response to said new instruction entering said pipeline; and determining from said vectors which instruction in said pipeline processor calculates a most recent operand value and reading the most recent operand value before updating the resource with the write instruction.

10. A method for identifying the location of a value used in an instruction being dispatched to a pipeline processor comprising:
   determining if operands for each instruction received are calculated in a previous instruction;
   creating a pointer, for an operand, which identifies a prior instruction which when executed determines the operand value;
   forwarding said operand value for said received instruction when said prior instruction is executed,
   wherein said pointer enables the operand value to be forwarded for said received instruction,
   wherein instructions which determine a common operand are identified by a recent vector which determines which instruction the pointer is to identify; and wherein more than one recent vectors of previously dispatched instructions which determine the common operand are decremented when a new instruction is dispatched which determines the common operand.

11. The method according to claim 10, further comprising dropping said pointer following forwarding of said operand value.

12. A method according to claim 1 further for avoiding a write after write hazard and a write comprising:
   determining whether there are older instructions in said pipeline processor which write a value to a resource other than a currently received instruction writing that resource;
   establishing a pointer for each newly received instruction reading that resource pointing to a most recent instruction which determines the value;
   canceling write instructions for said value which are determined to be older than said currently received instruction; and
   thereafter stalling execution until said value becomes available.

13. The method according to claim 12, further comprising writing a most recently determined value to a resource when there are no pointers which point to a previous instruction which writes said value.

* * * * *